United States Patent
Tabbut

(10) Patent No.: US 9,446,803 B2
(45) Date of Patent: Sep. 20, 2016

(54) EQUALIZER BAR METHOD AND MANUFACTURE

(71) Applicant: CATERPILLAR INC., Peoria (IL)

(72) Inventor: Nathan John Tabbut, Fargo, ND (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/552,335

(22) Filed: Nov. 24, 2014

(65) Prior Publication Data

US 2016/0144907 A1    May 26, 2016

(51) Int. Cl.
*B62D 55/084*    (2006.01)
*B62D 55/32*    (2006.01)

(52) U.S. Cl.
CPC ........... *B62D 55/0842* (2013.01); *B62D 55/32* (2013.01)

(58) Field of Classification Search
CPC ... B62D 55/0842; B62D 55/305; B62D 5/08
See application file for complete search history.

(56) References Cited

U.S. PATENT DOCUMENTS

| | | | |
|---|---|---|---|
| 3,825,074 A | 7/1974 | Stedman et al. | |
| 4,018,295 A * | 4/1977 | Hasselbacher | B62D 55/30 180/9.5 |
| 4,324,303 A * | 4/1982 | Balzer | B62D 55/30 180/9.5 |
| 4,364,443 A * | 12/1982 | Sato | B62D 55/0842 180/9.5 |
| 6,298,933 B1 * | 10/2001 | Simmons | B60G 7/001 180/9.46 |
| 7,516,805 B2 * | 4/2009 | Bedford | B62D 55/0842 180/9.46 |
| 7,861,413 B2 * | 1/2011 | Michael | B62D 55/0842 180/9.54 |
| 2006/0131083 A1 * | 6/2006 | Matthys | B62D 55/0842 180/9.5 |
| 2014/0166376 A1 * | 6/2014 | Maier | B65D 55/0842 180/9.5 |

* cited by examiner

*Primary Examiner* — Kevin Hurley
(74) *Attorney, Agent, or Firm* — Procopio, Cory, Hargreaves & Savitch LLP

(57) ABSTRACT

A method of repairing an equalizer bar including removing a portion of the end of the equalizer bar which may create an elongated member. The elongated member may include an attachment surface at one end. The method may include positioning an equalizer bar end to the elongated member. The equalizer bar end may include a hole and a mating surface configured to attach to the attachment surface of the elongated member. The method may include aligning the hole with a hole terminal end in the elongated member, and securing a fastener into the hole and hole terminal end.

19 Claims, 4 Drawing Sheets

EQUALIZER BAR METHOD AND MANUFACTURE

TECHNICAL FIELD

The present disclosure generally pertains to track type machines, and is more particularly directed toward repair of an equalizer bar of a track type machine.

BACKGROUND

Track type machines such as tractors commonly use a pair of tracks connected by an equalizer bar between to allow a degree of flexibility in movement of the tracks relative to the main frame. The equalizer bar is mounted to the main frame and each end of the equalizer bar is connected to one of the left hand or right hand side track roller frame. During operation of the tractor, the ends of the equalizer bar undergo considerable stress. This may cause the ends of the equalizer bar to become damaged and require repair. Such repair may be expensive and render the tractor out of commission for a lengthy period of time.

U.S. Patent Publication No. 2014/0166376 to R. Maier, et al., discloses an equalizer bar end joint that includes a pin defining a longitudinal axis and a bearing configured to support the pin. The bearing includes an inner race including a bore configured to cooperate with the pin and a semi-spherical outer surface.

The present disclosure is directed toward overcoming one or more of the problems discovered by the inventors.

SUMMARY OF THE DISCLOSURE

In an embodiment of the present application, a method of repairing an equalizer bar is provided. The method includes removing a portion of an end of the equalizer bar. This may create an elongated member including a corresponding mating surface at one end. The method may include creating a first receiving feature end in the mating surface of the elongated member, and creating a second receiving feature end in the mating surface of the elongated member. The method also includes positioning an equalizer bar end adjacent the elongated member. The equalizer bar end may include an upper surface, an outer surface, a bottom end, and a mating surface. The outer surface may be extending between the upper surface and the bottom end at one end of the equalizer bar end, and the mating surface extending between the upper surface and the bottom end at the end of the equalizer bar end opposite from the outer surface. The mating surface may be configured to attach to the corresponding mating surface of the elongated member. The equalizer bar end may include a first receiving feature extending from the upper surface all the way through the body of the equalizer bar end. The equalizer bar end may include a second receiving feature extending from the mating surface into the body of the equalizer bar end. The method may include aligning the first receiving feature of the equalizer bar end to the first receiving feature end of the elongated member, and aligning the second receiving feature of the equalizer bar end to the second receiving feature end of the elongated member. The method may include securing a first fastener into the first receiving feature, and securing a second fastener into the second receiving feature.

DETAILED DESCRIPTION

This disclosure relates to a method of repairing components of an undercarriage belonging to a tractor type machine. In particular, this disclosure relates to methods of repairing an equalizer bar of an undercarriage. The equalizer bar may be repaired by removing an end off of the equalizer bar, which may create an elongated member. A replacement part, such as an equalizer bar end, may be attached to the elongated member. A combination of holes and fasteners may be used to attach the equalizer bar end to the elongated member. For example, a first hole may be located in an upper surface of the equalizer bar end, in which the first hole is configured to align with a first hole terminal end located in an attachment surface of the elongated member.

Figure 1:
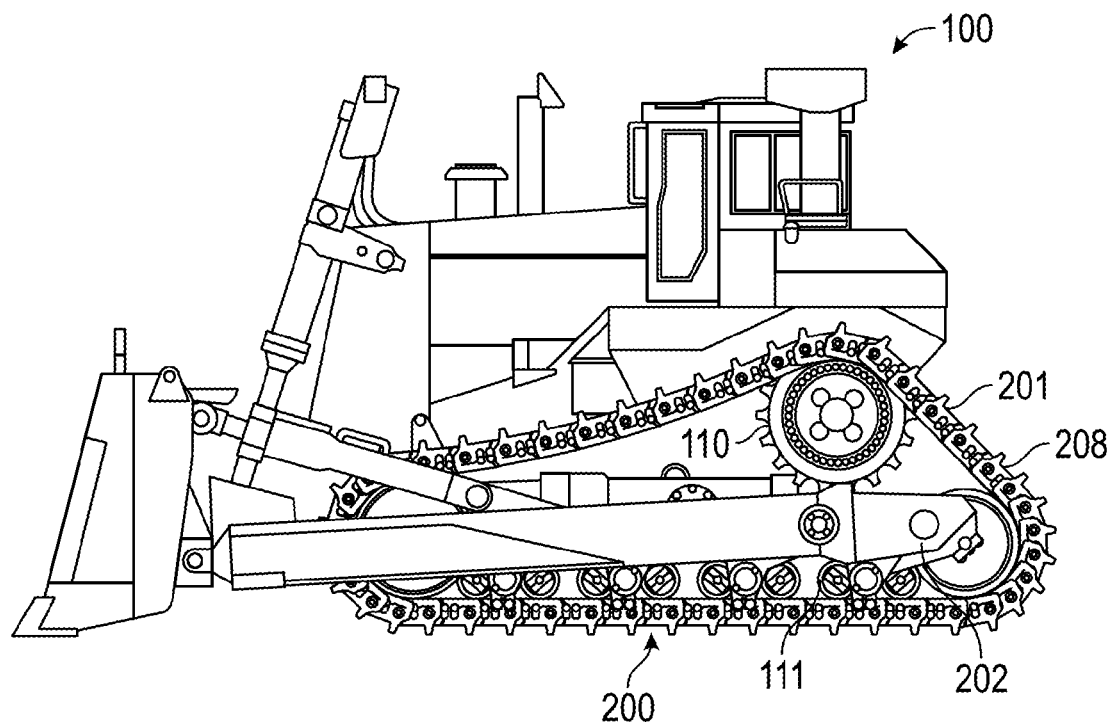
FIG. 1 is a side view of an exemplary machine 100, which may be a tractor assembly according to an embodiment of the present disclosure.

FIG. 1 is a side view of an exemplary machine 100, which may be a tractor assembly according to an embodiment of the present disclosure. The machine 100 may be a mobile machine that performs some type of operation associated with an industry such as mining, construction, farming, transportation, or any other industry known in the art. For example, the machine 100 may be a track-type tractor, as depicted in FIG. 1. Machine 100 may include an undercarriage 200 featuring a first continuous track 201 and a first track frame 202 on one side of the machine 100, and a second continuous track and second track frame on the opposite side (not shown). Each continuous track may feature plurality of ground engaging members 208. Undercarriage 200 may feature a plurality of rollers 111 mounted underneath the first track frame 202. The rollers 111 may support and guide the ground engaging members 208. Undercarriage 200 may also include a drive member 110 connected to a drive train (not shown) which may be configured to engage and drive the first and second continuous tracks.

Figure 2:
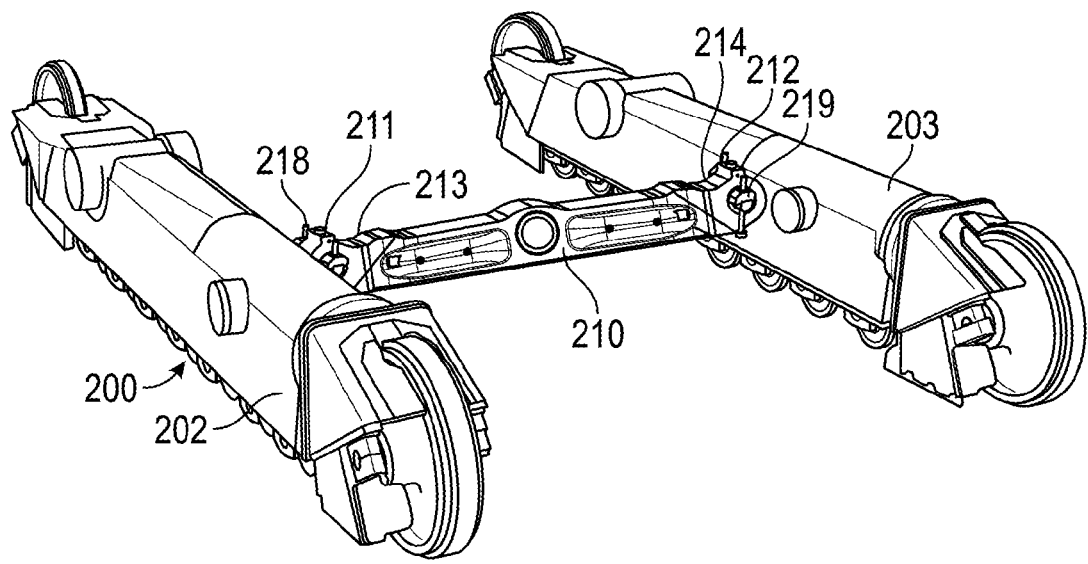
FIG. 2 is a perspective view of an exemplary undercarriage 200 of the machine 100 shown in FIG. 1.

FIG. 2 is a perspective view of an exemplary undercarriage 200 of the machine 100 shown in FIG. 1. Certain details or features of various components of undercarriage 200 have been left out of the figure for clarity. The undercarriage 200 may be configured to include a first track frame 202 and a second track frame 203, which may be disposed on the opposite sides of machine 100. An equalizer bar 210 may be disposed between first and second track frames 202, 203, and may connect the two track frames together. The equalizer bar 210 may include an elongated member 229, a first equalizer bar end 213, and a second equalizer bar end 214. First equalizer bar end 213 may be located at a first end 211, and second equalizer bar end 214 may be located at a second end 212. First equalizer bar end 213 may be connected to first track frame 202 by a first end joint 218, and second equalizer bar end 214 connected to second track frame 203 by a second end joint 219. The first end joint 218 and the second end joint 219 may be configured to accommodate movement while maintaining alignment of the first track frame 202 and the second track frame 203 relative to each other as the machine 100 travels over uneven ground.

Figure 3:
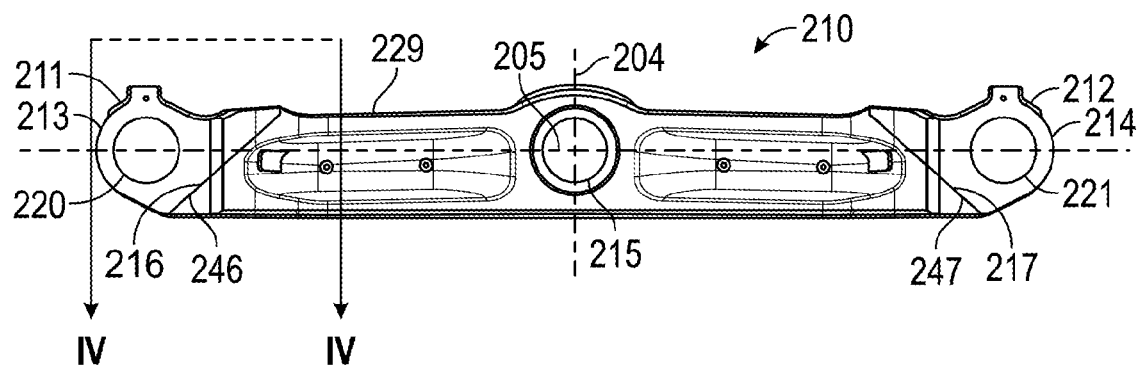
FIG. 3 is a front view of an equalizer bar 210 of the undercarriage 200 shown in FIG. 2.

FIG. 3 is a front view of an equalizer bar 210 of the undercarriage 200 shown in FIG. 2. As shown, equalizer bar 210 may include a center bore 215, a first end bore 220, and a second end bore 221. First end bore 220 and second end bore 221 may be located in first equalizer bar end 213 and second equalizer bar end 214, respectively. Equalizer bar 210 may include a vertical axis 204 and a horizontal axis 205. Vertical axis 204 may be an axis of bilateral symmetry travelling in an up and down direction, and may divide center bore 215 into two equal left and right halves. In some embodiments, vertical axis 204 may divide equalizer bar 210 into two equal left and right halves. Horizontal axis 205 may be perpendicular to vertical axis 204, and may divide center bore 215 into two equal top and bottom halves. In some embodiments, horizontal axis 205 may divide equalizer bar 210 into two equal top and bottom halves. In some embodiments, first end bore 220, second end bore 221, and center bore 215 may each be aligned to horizontal axis 205. In particular instances, horizontal axis 205 may travel along the elongated direction of equalizer bar 210.

In some embodiments, a first mating surface 216 may be located at one end of first equalizer bar end 213. A second mating surface 217 may also be located at one end of second equalizer bar end 214. In some embodiments, elongated member 229 may include an attachment surface 246 (sometimes referred to as a first corresponding mating surface) located at one end of elongated member 229, and another attachment surface 247 (sometimes referred to as a second corresponding mating surface) located at the opposite end of elongated member 229 from attachment surface 246. In particular instances, first mating surface 216 may be configured to align with first corresponding mating surface 246, and second mating surface 217 may be configured to align with second corresponding mating surface 247. In some embodiments, first equalizer bar end 213 may be assembled with elongated member 229 by attaching first mating surface 216 to first corresponding mating surface 246. Furthermore, second equalizer bar end 214 may also be assembled with elongated member 229 by attaching second mating surface 217 to second corresponding mating surface 247. In particular instances, first mating surface 216 may be attached to first corresponding mating surface 246 by bolts, screws, nails, clips, pins, clamps, or other fastening methods. Second mating surface 217 may be attached to second corresponding mating surface 247 by similar methods.

Figure 4:
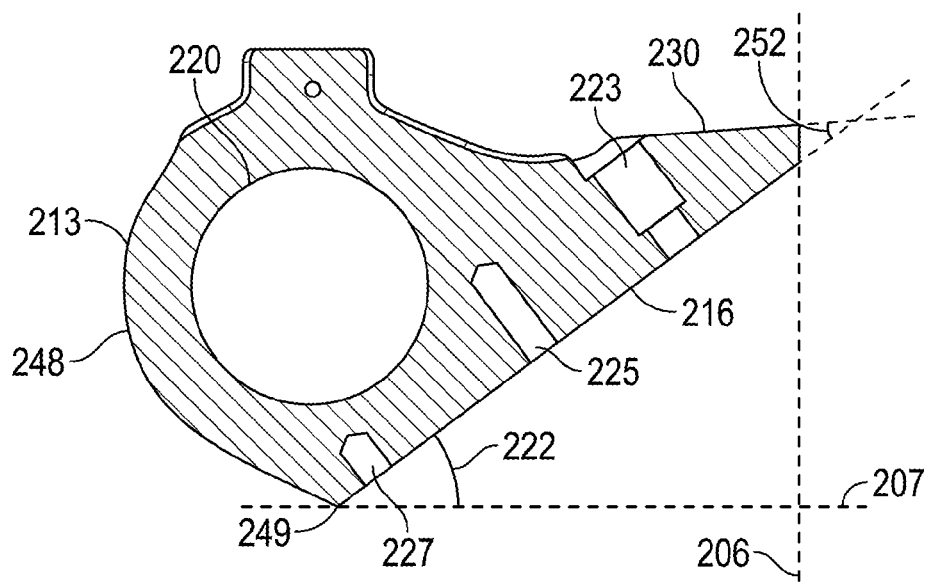
FIG. 4 is a cross sectional view of first equalizer bar end 213 taken along line IV-IV of FIG. 3.

FIG. 4 is a cross sectional view of first equalizer bar end 213 taken along line IV-IV of FIG. 3. In particular, the figure depicts a front view of a cross section of first equalizer bar end 213. In some embodiments, first equalizer bar end 213 may be formed from a casted or forged metal part. In other embodiments, first equalizer bar end 213 may be formed as a result of cutting elongated member 229 a certain distance from first end 211 of equalizer bar 210. First mating surface 216 may be formed as a result of the cutting.

All references to first equalizer bar end 213 or elements of equalizer bar end 213 may also be applied to second equalizer bar 214. In some embodiments, first equalizer bar end 213 may be identical to second equalizer bar end 214. Furthermore, first equalizer bar end 213 may be interchangeable with second equalizer bar end 214.

First equalizer bar end 213 may include an upper surface 230, an outer surface 248, and a bottom end 249. Outer surface 248 may be located in between upper surface 230 and bottom end 249 at one end of first equalizer bar end 213. In some embodiments, outer surface 248 may be rounded. First mating surface 216 may be located in between upper surface 230 and bottom end 249 at the opposite end of first equalizer bar end 213 from outer surface 248. In some embodiments, first mating surface 216 may be a flat surface configured to align and attach to a surface of elongated member 229.

In some embodiments, first equalizer bar end 213 may include a plurality of bolt holes. For instance, first equalizer bar end 213 may include bolt hole 223 (sometimes referred to as first bolt hole 223), bolt hole 225, and bolt hole 227 (sometimes referred to as second bolt hole 227). Bolt holes may generally be referred to as holes or receiving features. In some embodiments, bolt holes may be a receiving feature configured to receive a fastener or other attachment mechanisms. First equalizer bar end 213 may also include additional bolt holes such as the bolt holes illustrated in FIG. 5 described below. Each bolt hole may include a diameter of 10 mm to 50 mm. First bolt hole 223 may extend from upper surface 230 of first equalizer bar end 213. In some instances, bolt hole 223 may extend from upper surface 230 all the way through the body of first equalizer bar end 213. Bolt hole 225 and bolt hole 227 may extend from first mating surface 216 into the body of first equalizer bar end 213. In some instances, bolt hole 225 may extend into the body of first equalizer bar end 213 a depth of about twice the diameter of bolt hole 225. In some instances, bolt hole 227 may extend into the body of first equalizer bar end 213 a depth of about twice the diameter of bolt hole 227.

Fasteners, such as bolts, may be inserted into any of the bolt holes. Such fasteners may be used to assemble first equalizer bar end 213 to elongated member 229. In certain instances, a fastener may be inserted from the top side of first equalizer bar end 213, such as upper surface 230. In other instances, a fastener may be inserted from first corresponding mating surface 216 of elongated member 229. For instance, a fastener may be inserted from first corresponding mating surface 246, which may extend past first mating surface 216 into bolt hole 227. The direction of insertion of a fastener may depend on the geometrical boundaries of first equalizer bar end 213 and elongated member 229.

First equalizer bar end 213 may include a vertical axis 206 and a horizontal axis 207. Vertical axis 206 may be parallel to vertical axis 204 of equalizer bar 210 (shown in FIG. 3), and horizontal axis 207 may be parallel to horizontal axis 205 of equalizer bar 210 (shown in FIG. 3). In some embodiments, horizontal axis 207 may travel along the same direction as the elongated direction of elongated member 229. First mating surface 216 may be oriented at an angle 222 relative to horizontal axis 207. In some embodiments, angle 222 may be 30° to 60° relative to horizontal axis 207. In some embodiments, angle 222 may be about 45° relative to horizontal axis 207. In some embodiments, angle 222 may be about 45° relative to a flat ground. In some embodiments, first mating surface 216 may be oriented at an angle 252 relative to upper surface 230. In such embodiments, angle 252 may be 30° to 60° relative to upper surface 230. In some embodiments, angle 252 may be about 45° relative to upper surface 230.

First equalizer bar end 213 may include first end bore 220 located near outer end 248. First end bore 220 may be located below upper surface 230. First end bore 220 may feature a circular hole of varying diameters to accommodate standard undercarriage components. First end bore 220 may be assembled with certain components of undercarriage 200 shown in FIG. 2, such as first end joint 218.

Figure 5:
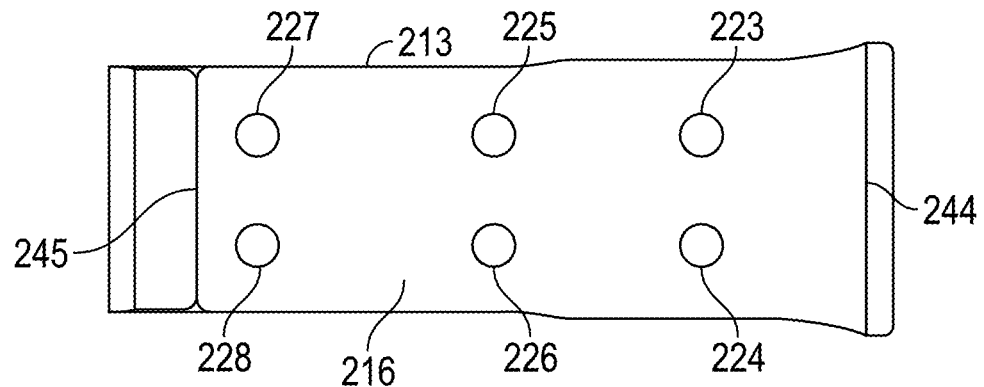
FIG. 5 is a view of first mating surface 216 of first equalizer bar end 213 depicted in FIG. 4.

FIG. 5 is a view of first mating surface 216 of first equalizer bar end 213 depicted in FIG. 4. As shown, first equalizer bar end 213 may include first bolt hole 223, second bolt hole 224, third bolt hole 225, fourth bolt hole 226, fifth bolt hole 227, and sixth bolt hole 228. First equalizer bar end 213 may include an upper end 244 and a lower end 245. First bolt hole 223 and second bolt hole 224 may form a pair of bolt holes and be aligned to a same plane. First bolt hole 223 and second bolt hole 224 may be located near upper end 244. Additionally, third bolt hole 225 and fourth bolt hole 226 may form a pair of bolt holes and be aligned to a same plane, and fifth bolt hole 227 and sixth bolt hole 228 may form a pair of bolt holes and be aligned to a same plane. Fifth bolt hole 227 and sixth bolt hole 228 may be located near lower end 245.

In some embodiments, at least one fastener may be inserted into one of the bolt holes and may be used to assemble first equalizer bar end 213 to elongated member 229. In some instances, a plurality of fasteners may be used to assemble first equalizer bar end 213 to elongated member 229. For instance, six fasteners may be used, one in each of first bolt hole 223, second bolt hole 224, third bolt hole 225, fourth bolt hole 226, fifth bolt hole 227, and sixth bolt hole 228, to assemble first equalizer bar end 213 to elongated member 229.

Figure 6:
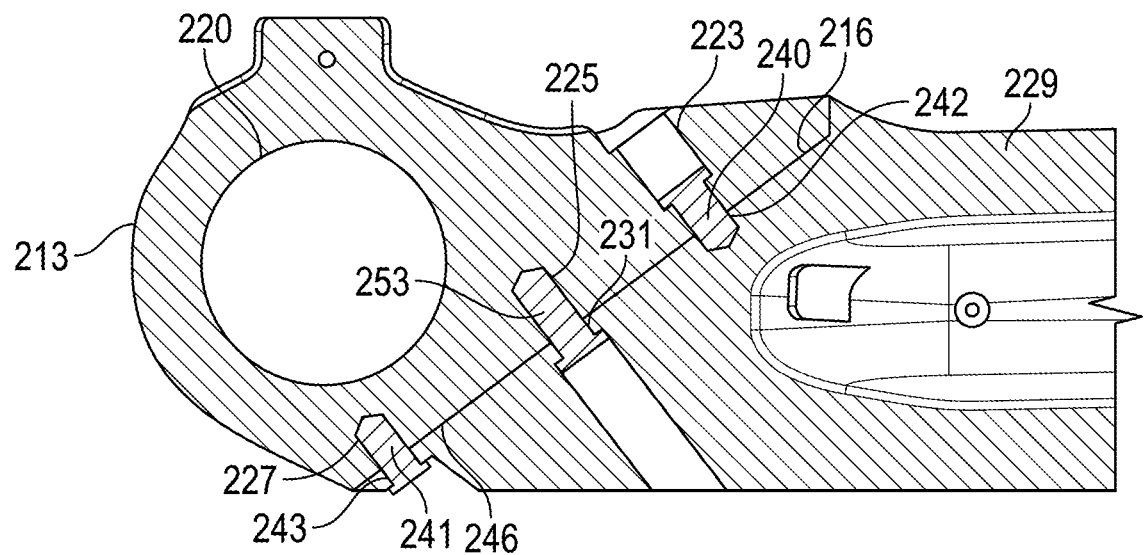
FIG. 6 is a cross sectional view of first equalizer bar end 213 assembled with elongated member 229 taken along line IV-IV of FIG. 3.

FIG. 6 is a cross sectional view of first equalizer bar end 213 assembled with elongated member 229 taken along line IV-IV of FIG. 3. As shown, first equalizer bar end 213 and elongated member 229 may be attached to one another. When attached, first mating surface 216 may be flush with first corresponding mating surface 246. This particular embodiment of first equalizer bar end 213 may include a bolt hole 223, a bolt hole 225, and a bolt hole 227. Elongated member 229 may include a bolt hole terminal end 231, a bolt hole terminal end 242, and a bolt hole terminal end 243. Bolt hole terminal end 231, bolt hole terminal end 242, and bolt hole terminal end 243 may each extend from first corresponding mating surface 246 a certain depth into the body of elongated member 229. In some instances, bolt hole terminal end 231 and bolt hole terminal end 243 may extend all the way through the body of elongated member 229. Bolt hole terminal end 231 may be configured to align with bolt hole 225, bolt hole terminal end 242 may be configured to align with bolt hole 223, and bolt hole terminal end 243 may be configured to align with bolt hole 227. Bolt hole terminal ends may be generally referred to as hole terminal ends or receiving feature ends. In some embodiments, bolt hole terminal ends may be a receiving feature end aligned with a receiving feature, such as bolt hole 223. Furthermore, in some embodiments, each bolt hole and bolt hole terminal end may be threaded.

A fastener 240 may be inserted into or positioned within bolt hole 223 and extend through bolt hole 223. After extending through bolt hole 223, fastener 240 may extend into bolt hole terminal end 242. In particular instances, fastener 240 may be screwed into bolt hole 223 and bolt hole terminal end 242. This process may couple first equalizer bar end 213 to elongated member 229. After coupling, first mating surface 216 may be flush with the first corresponding mating surface 246. A fastener 241 may be inserted into bolt hole terminal end 243 and extend through bolt hole terminal end 243 and bolt hole 227. In addition, a fastener 253 may be inserted into bolt hole terminal end 231 and extend through bolt hole terminal end 231 and bolt hole 225. Fastener 241 and fastener 253 may also couple first equalizer bar end 213 to elongated member 229. In particular embodiments, a portion of elongated member 229 may be drilled to allow for room for installation of fastener 241 and fastener 253. This portion may be referred to as a counter sunk hole or a spot face. In such embodiments, the counter sunk hole may include a diameter large enough for the head of a fastener and the tool to install the fastener. All fasteners may be removable from any bolt hole or bolt hole terminal end. This may aid in decoupling an equalizer bar end from an elongated member.

INDUSTRIAL APPLICABILITY

Equalizer bars may be subject to considerable stress during the operation of a machine such as a tractor. The ends of equalizer bars, such as first equalizer bar end 213 and second equalizer bar end 214, may be subject to a great amount of stress during operation of a tractor. Equalizer bar ends may take a great amount of the load when a tractor travels across uneven surfaces. This may cause parts of the equalizer bar ends, such as the end bores, to crack or elongate, and may require expensive repair. Traditional methods of repairing equalizer bars often involve large amounts of cutting and welding which may be very costly. The present invention may reduce the costs of repair by providing manufactured replacement equalizer bar ends that can be quickly and inexpensively attached to a damaged equalizer bar. In addition, the present invention may provide easy to repair equalizer bars that already include detachable pieces such as equalizer bar ends that may be quickly swapped when damaged.

Figure 7:
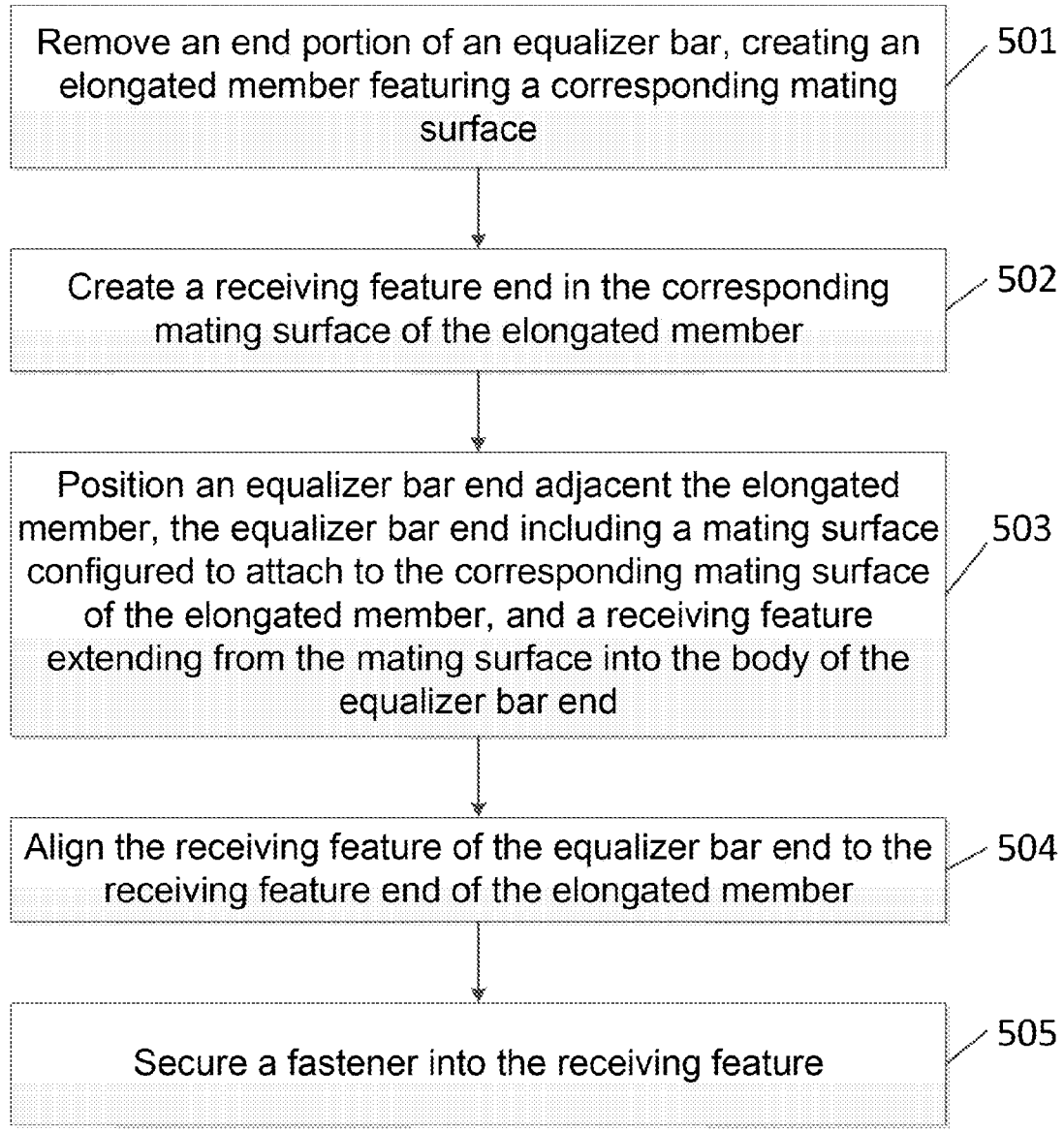
FIG. 7 is a flowchart of a process for repairing an equalizer bar.

FIG. 7 is a flowchart of a process for repairing equalizer bars. In a Step 501, an end portion of an equalizer bar, such as equalizer bar 210, may be removed from the equalizer bar. In some embodiments, this may leave behind or create an elongated member, such as elongated member 229, featuring a corresponding mating surface. The corresponding mating surface may be the surface formed as a result of the removal of the end. In some embodiments, the removed end may be an equalizer bar end. In particular instances, the removed end may be discarded. The end may be removed by cutting, slicing, shearing, or another similar removal method. The end may be cut from the equalizer bar at an angle relative to the upper surface of the equalizer bar. In some instances, the angle may be 30° to 60° relative to the upper surface of the equalizer bar. In some instances, the angle may be 45° relative to the upper surface of the equalizer bar. The corresponding mating surface may feature the same angle relative to the upper surface of the equalizer bar as the angle of the cut. The angle of the cut may be important after the replacement of the end by an equalizer bar end as will be discussed below in Step 503. The angle may be important to allow for the replacement equalizer bar end and the elongated member to absorb most or all of the load during operation of the machine. The angle may affect the structural integrity of the machine. If the angle is too steep or too shallow, then the fastener will absorb most of the load and may break if there is too much load.

In a Step 502, a receiving feature end (sometimes referred to as a hole terminal end) may be created in the corresponding mating surface of the elongated member. In some instances, the receiving feature end may be a hole drilled a certain depth into the elongated member. The receiving feature end may be configured to align with certain features of an equalizer bar end. The receiving feature end may be threaded. In some embodiments, a portion of the elongated member may be removed to allow space to install a fastener into the receiving feature end.

In a Step 503, an equalizer bar end, such as first equalizer bar end 213, may be positioned adjacent the elongated member. In some embodiments, the equalizer bar end may be a casted or forged metal part, or may be formed from salvaged metal scraps. In some embodiments, the equalizer bar end may include an end bore located near an outer surface of the equalizer bar end and below an upper surface of the equalizer bar end. In instances where the equalizer bar end is formed from casting or forging, the end bore may include a smaller diameter by design. This may allow for machining of the end bore to a larger diameter if necessary. Alternatively, equalizer bar end may be salvaged from existing equalizer bars.

In particular embodiments, the equalizer bar end may include a mating surface. Furthermore, the equalizer bar end may include an upper surface, an outer surface, and a bottom end. The outer surface may extend between the upper surface and the bottom end at one end of the equalizer bar end. In some embodiments, the outer surface may be rounded. Moreover, the mating surface may extend between the upper surface and the bottom end at the opposite end of equalizer bar end from the outer surface. The mating surface may be configured to attach to the corresponding mating surface of the elongated member. In addition, the mating surface may feature an angle identical to the corresponding mating surface of the elongated member.

In certain instances, a receiving feature may extend from the mating surface into the body of the equalizer bar end. The receiving feature may be a hole drilled into the mating surface of the equalizer bar end. The hole may be drilled a certain depth into the equalizer bar end. In addition, the hole may be located near the upper end or lower end of the equalizer bar end. In some embodiments, the hole may be threaded.

In some embodiments, the equalizer bar end may be cut off from a damaged equalizer bar and then repaired separately. After repair of the equalizer bar end, it can be reassembled to the equalizer bar it originated from.

In a Step 504, the receiving feature of the equalizer bar end may be aligned to the receiving feature end of the elongated member. In certain embodiments where the receiving feature is a hole and the receiving feature end is a hole terminal end, the alignment of the receiving feature and the receiving feature end may form an elongated hole.

In a Step 505, a fastener may be secured into the receiving feature. In instances where the receiving feature and the receiving feature end are aligned, the fastener may be secured into both the receiving feature and the receiving feature end. In some embodiments, the securement of the fastener may mate the mating surface to the corresponding mating surface. This may couple the equalizer bar end to the elongated member.

The present invention may apply not only for tractors, but also other machines that utilize a track or undercarriage. For instance, the present invention may apply to skid loaders or tank machinery. Additionally, the present invention may apply to machinery that includes a sway bar. This may include machines such as vehicles.

The preceding detailed description is merely exemplary in nature and is not intended to limit the invention or the application and uses of the invention. The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention.

Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method of repairing an equalizer bar for connecting track frames in a track type machine, the method comprising:
    removing a portion of an end of the equalizer bar, to create an elongated member including a first corresponding mating surface at one end;
    creating a first receiving feature end in the first corresponding mating surface of the elongated member;
    positioning a first equalizer bar end adjacent to the elongated member, the first equalizer bar end including
        an upper surface, an outer surface, a bottom end, and a first mating surface, the outer surface extending between the upper surface and the bottom end at one end of the first equalizer bar end, and the first mating surface extending between the upper surface and the bottom end at the end of the first equalizer bar end opposite from the outer surface, wherein the first mating surface is configured to attach to the first corresponding mating surface of the elongated member,
        a first receiving feature extending from the first mating surface into the body of the first equalizer bar end;
    aligning the first receiving feature of the first equalizer bar end to the first receiving feature end of the elongated member; and
    securing a first fastener into the first receiving feature.

2. The method of claim 1, further comprising
    removing a portion of the opposite end of the equalizer bar, to create a second corresponding mating surface located at the opposite end of the elongated member;
    creating a second receiving feature end in the second corresponding mating surface of the elongated member;
    positioning a second equalizer bar end adjacent to the elongated member, the second equalizer bar end including
        an upper surface, an outer surface, a bottom end, and a second mating surface, the outer surface extending between the upper surface and the bottom end at one end of the second equalizer bar end, and the second mating surface extending between the upper surface and the bottom end at the end of the second equalizer bar end opposite from the outer surface, wherein the second mating surface is configured to attach to the second corresponding mating surface of the elongated member,
    a second receiving feature extending from the second mating surface into the body of the second equalizer bar end;
    aligning the second receiving feature of the second equalizer bar end to the second receiving feature end of the elongated member; and
    securing a second fastener into the second receiving feature.

3. The method of claim 2, further comprising
    creating a third receiving feature end in the first corresponding mating surface of the elongated member, and creating a fourth receiving feature end in the second corresponding mating surface of the elongated member;

wherein the first equalizer bar end includes a third receiving feature extending from the mating surface into the body of the first equalizer bar end, and the second equalizer bar end includes a fourth receiving feature extending from the mating surface into the body of the second equalizer bar end;

aligning the third receiving feature of the first equalizer bar end to the third receiving feature end of the elongated member, and aligning the fourth receiving feature of the second equalizer bar end to the fourth receiving feature end of the elongated member; and securing a third fastener into the third receiving feature, and securing a fourth fastener into the fourth receiving feature.

4. The method of claim 3, wherein the first equalizer bar end and the second equalizer bar end are interchangeable.

5. The method of claim 1, wherein the first mating surface is oriented at an angle relative to the upper surface of the first equalizer bar end.

6. The method of claim 5, wherein the first corresponding mating surface is oriented at an angle identical to the angle of the first mating surface.

7. The method of claim 5, wherein the angle of the first mating surface is 30 to 60 degrees relative to the upper surface of the first equalizer bar end.

8. The method of claim 7, wherein the angle of the first mating surface is 45 degrees relative to the upper surface of the first equalizer bar end.

9. The method of claim 1, wherein the first equalizer bar end is created by casting or forging.

10. An equalizer bar for connecting track frames in a track type machine, the equalizer bar comprising:

a first equalizer bar end including
an upper surface, an outer surface, a bottom end, and a first mating surface, the outer surface extending between the upper surface and the bottom end at one end of the first equalizer bar end, and the first mating surface extending between the upper surface and the bottom end at the end of the first equalizer bar end opposite from the outer surface, wherein the outer surface and first mating surface are unitary, and
a first hole extending from the first mating surface into the body of the first equalizer bar end;

an elongated member including
a center bore,
a first corresponding mating surface at one end of the elongated member, the first corresponding mating surface including an upper end and a lower end, and the first corresponding mating surface configured to mate with the first mating surface of the first equalizer bar end, and
a first hole terminal end extending from the first corresponding mating surface into the body of the elongated member, the first hole terminal end aligned with the first hole of the first equalizer bar end; and
a first fastener positioned within the first hole and the first hole terminal end, the first fastener extending from the first mating surface to secure the first equalizer bar end to the elongated member.

11. The equalizer bar of claim 10, further comprising
a second equalizer bar end including
an upper surface, an outer surface, a bottom end, and a second mating surface, the outer surface extending between the upper surface and the bottom end at one end of the second equalizer bar end, and the second mating surface extending between the upper surface and the bottom end at the end of the second equalizer bar end opposite from the outer surface, and
a second hole extending from the second mating surface into the body of the second equalizer bar end;

wherein the elongated member further comprises
a second corresponding mating surface at the opposite end of the elongated member from the first corresponding mating surface, the second corresponding mating surface including an upper end and a lower end, and the second corresponding mating surface configured to mate with the second mating surface of the second equalizer bar end,
a second hole terminal end extending from the second corresponding mating surface into the body of the elongated member, the second hole terminal end aligned with the second hole of the second equalizer bar end; and
a second fastener positioned within the second hole and the second hole terminal end, the second fastener extending from the second mating surface to secure the second equalizer bar end to the elongated member.

12. The equalizer bar of claim 11, further comprising
a third hole extending from the first mating surface into the body of the first equalizer bar end;
a third hole terminal end extending from the first corresponding mating surface into the body of the elongated member, the third hole terminal end aligned with the third hole of the first equalizer bar end;
a third fastener positioned within the third hole and the third hole terminal end, the third fastener extending from the first corresponding mating surface to secure the first equalizer bar end to the elongated member;
a fourth hole extending from the second mating surface into the body of the second equalizer bar end;
a fourth hole terminal end extending from the second corresponding mating surface into the body of the elongated member, the fourth hole terminal end aligned with the fourth hole of the second equalizer bar end; and
a fourth fastener positioned within the fourth hole and the fourth hole terminal end, the fourth fastener extending from the second corresponding mating surface to secure the second equalizer bar end to the elongated member.

13. The equalizer bar end of claim 12, wherein first equalizer bar end and the second equalizer bar end are interchangeable.

14. The equalizer bar of claim 11, wherein the first mating surface is oriented 30 to 60 degrees relative to the upper surface of the first equalizer bar end, and the second mating surface is oriented 30 to 60 degrees relative to the upper surface of the second equalizer bar end.

15. An undercarriage of a track type machine, the undercarriage including the equalizer bar of claim 10.

16. An equalizer bar end configured to attach to an elongated member of an equalizer bar for connecting track frames in a track type machine, the equalizer bar end comprising:

an upper surface, an outer surface, a bottom end, and a mating surface, the outer surface extending between the upper surface and the bottom end at one end of the equalizer bar end, the mating surface extending between the upper surface and the bottom end at the end of the equalizer bar end opposite from the outer surface, and the mating surface configured to attach to a corresponding mating surface of an elongated member;

a bore located near the outer surface and below the upper surface;

a first hole extending from the upper surface all the way through the body of the equalizer bar end, the first hole configured to align with a hole located in the elongated member;

a second hole extending from the mating surface a certain depth into the body of the equalizer bar end, the second hole configured to align with a hole located in the elongated member, a third hole adjacent the first hole, and a fourth hole adjacent the second hole.

17. The equalizer bar end of claim 16, wherein the mating surface is attached to the corresponding mating surface of the elongated member by a fastener inserted through the first hole and the second hole.

18. The equalizer bar end of claim 16, wherein the diameter of the first hole and the second hole is 10 mm to 50 mm.

19. The equalizer bar end of claim 16, wherein the mating surface is oriented 30 to 60 degrees relative to the upper surface.

* * * * *